US006542167B1

(12) United States Patent
Darlet et al.

(10) Patent No.: US 6,542,167 B1
(45) Date of Patent: Apr. 1, 2003

(54) SYSTEM AND METHOD FOR FLEXIBLE SOFTWARE LINKING

(75) Inventors: Pierre-Alain Darlet, Vannes (FR); Thierry C. Preyssler, Oakland, CA (US); David N. Wilner, Berkeley, CA (US)

(73) Assignee: Wind River Systems, Inc., Alameda, CA (US)

( * ) Notice: Subject to any disclaimer, the term of this patent is extended or adjusted under 35 U.S.C. 154(b) by 0 days.

(21) Appl. No.: 09/493,490

(22) Filed: Jan. 28, 2000

(51) Int. Cl.[7] .................................................. G06F 9/00
(52) U.S. Cl. ........................ 345/762; 717/151; 345/826
(58) Field of Search ................................ 345/762, 765, 345/744, 804, 826; 709/331, 332, 333; 717/9, 5, 4, 157, 158

(56) References Cited

U.S. PATENT DOCUMENTS

| 5,247,679 | A | | 9/1993 | Arun |
| 5,303,392 | A | | 4/1994 | Carney et al. |
| 5,734,822 | A | | 3/1998 | Houha et al. |
| 5,835,743 | A | | 11/1998 | Zucker |
| 5,991,871 | A | | 11/1999 | Zucker |
| 6,202,205 | B1 | * | 3/2001 | Saboff et al. ................ 709/333 |
| 6,314,566 | B1 | * | 11/2001 | Arrouye et al. .............. 709/331 |

FOREIGN PATENT DOCUMENTS

| DE | 21 50 506 | | 5/1973 |
| EP | 0 620 522 A | | 10/1994 |

OTHER PUBLICATIONS

R. E. Bryant,. et al., Feb. 13, 2002,* 15–213 Handout #3: Linking, pp. 1–42.
"The Design and Implementation of the Clouds Distributed Operating System," Dasgupta (Georgia Tech), Computing Systems, Winter 1990.
"A Micro Kernal Architecture for Next Generation Processors, "Okamoto (Toshiba Corp.), USENIX, 1992.
"Sharing and Protection in a Single Address Space Operating System (Opal)," Chase (University of Washington), 1995.
Jeff Bonwick, The Slab Allocator: An Object–Caching Kernel Memory Allocator, 1994, 12 pages, Sun Microsystems.
Draves et al., The Rialto Virtual Memory System, Feb. 15, 1997, 14 pages, Microsoft Research.
Jones et al., An Overview of the Rialto Real–Time Architecture, Jul. 1996, 9 pages, Microsoft Research.
Mitchell et al., An Overview of the Spring System, 1994, 10 pages, Sun microsystems Inc.
Khalidi et al., The Spring Virtual Memory System, Feb. 1993, 25 pages, Sun microsystems Laboratories, Inc.
Hamilton et al., Subcontract: A Flexible Base for Distributed Progamming, 1993, 11 pages, Sun Microsystems Laboratories, Inc.
Radia et al., Persistence in the Spring System, Dec. 1993, 12 pages, Sun Microsystems, Inc.
Radia et al., The Spring Name Service, Nov. 1993, 27 pages, Sun Microsystems Laboratories, Inc.
Radia et al., Naming Policies in the Spring System, 11 pages, Sun Microsystems Laboratories, Inc.

(List continued on next page.)

*Primary Examiner*—Cao H. Nguyen
(74) *Attorney, Agent, or Firm*—Kenyon & Kenyon (57) ABSTRACT

A loading and linking process allows for the flexible loading and linking of software modules into a memory space, without regard to the order in which symbols are defined and referenced in such software modules, and without generating dangling references. An unloading process allows for software module unloading/unlinking from an already linked set of software modules, also without generating dangling references. A loading/linking system may be used to perform these processes.

23 Claims, 9 Drawing Sheets

OTHER PUBLICATIONS

Hamilton et al., The Spring Nucleus A MicroKernel for Objects, Jul. 1993, 14 pages, Sun Microsystems Laboratories, Inc.

Nelson et al., High Performance Dynamic Linking Through Caching, 1993, 14 pages, Sun Microsystems Laboratories, Inc.

Reed et al., Nemesis The Kernel, Overview, May 20, 1997, 56 pages.

Steven Hand, ESPRIT LTR 21917 (Pegasus II), Deliverable 2.3.1: Virtual Address Management: Deliverable 2.3.2: Virtual Memory Management, Jul. 1997, 16 pages, University of Cambridge.

Timothy Roscoe, Linkage in the Nemesis Single Address Space Operating System, May 1994, 8 pages, Computer Laboratory, University of Cambridge.

Richard Black, ESPRIT LTR 21917 (Pegasus II), Deliverable 2.1.4., ARM Port Report, Jun. 1997, 13 pages, University of Cambridge, University of Glasgow.

Kempf et al., Cross–address Space Dynamic Linking, Sep. 1992, 12 pages, Sun Microsystems Laboratories, Inc.

Heiser et al., Implementation and Performance of the Mungi Single–Address–Space Operating System, Jun. 1997, 23 pages, IBM T. J. Watson, Research Center.

Vochteloo et al., Protection Domain Extensions in Mungi, Oct. 1996, 5 pages, School of Computer Science and Engineering, The University of New South Wales.

Heiser et al., Resource Management in the Mungi Single–Address–Space Operating Systems, Aug. 1997, 15 pages, School of Computer Science and Engineering.

VxWorks® Programmer's Guide 5.3.1, Edition 1, Mar. 4, 1997 Wind River Systems, Inc., 648 pp.

* cited by examiner

| Software Module | Reference Locations | Reference Offsets |
|---|---|---|
| <module_0> | <address_0> | <offset_0> |
| | <address_1> | <offset_1> |
| | <address_2> | <offset_2> |
| <module_1> | <address_0> | <offset_0> |
| <module_2> | <address_0> | <offset_0> |
| | <address_1> | <offset_1> |
| ... | ... | ... |

SYSTEM AND METHOD FOR FLEXIBLE SOFTWARE LINKING

BACKGROUND INFORMATION

In computer systems, and in particular, as part of computer operating systems and software development environments, tools may be provided to allow the "loading" and "linking" of "software modules" (e.g., object files) for execution, for example, as part of an application program. Such software modules may include instructions and/or data structures, each positioned at particular locations in the software module. Instructions in software modules may make references to instructions or data structures both inside and outside of the software module (for example, in another software module). "Linking" involves "resolving" these references, so that an instruction making a reference will include the location of the instruction or data structure to be accessed.

References are typically indicated by "symbols" used to represent the desired location. The resolution process includes "defining" a symbol—assigning a value (e.g., a memory address) to the symbol by the software module that contains the locations to which access is to be allowed—and then substituting the symbol value for any references to the symbol used in other software modules.

In previous linking implementations, software modules needed to be linked in an order such that the symbol definition was established before the symbol was referenced by the software module being linked. For example, if a symbol "A1B2C3" were referenced in a particular software module, the symbol "A1B2C3" must have been defined by a previously loaded software module, so that a value for the symbol would be known by the linker. Where the symbol was not previously defined, the linker could abort the linking process, or could simply skip the resolution step for the particular symbol, leaving a "dangling" reference in the software module being linked—the instructions using the symbol reference would contain an undefined value for the memory location to access. Dangling references may cause abnormal execution (since they are undefined), and may cause corruption of other parts of the system.

Moreover, once a set of software modules has been completely linked, it heretofore has been extremely difficult to "unlink" one or more of the set of software modules without compromising the integrity of the application using the software module or the system itself. Once software modules are linked, the linker generally discards all information about the linking process in order to conserve memory (information that is not necessary during execution), including any symbols used during linking. Thus, removing a particular software module from a linked set of software modules can result in dangling references by instructions to the (now removed) software module, resulting in the same problems discussed above.

SUMMARY OF THE INVENTION

An exemplary embodiment according to the present invention implements a method that includes the steps of locating a symbol reference to a symbol in a first software module, the first software module including at least one instruction using the symbol reference, and parsing a symbol table to locate an entry for the symbol, the entry for the symbol including a symbol value. The method also includes creating the entry for the symbol in the symbol table when the parsing does not locate the entry for the symbol in the symbol table, the entry for the symbol including a pending indication and a default value as the symbol value, and changing the at least one instruction using the symbol reference based on the default value.

The exemplary embodiment according to the present invention also implements a method that includes the steps of unloading a software module from a set of linked software modules and parsing a symbol table to locate at least one symbol table entry associated with a symbol defined by the software module, the at least one symbol table entry including a symbol value and a reference data structure of a number of locations using the symbol. The method also includes changing the symbol value to a default value, including in the at least one symbol table entry a pending indication, and changing the number of locations using the symbol based on the default value.

The exemplary embodiment according to the present invention also implements a system that includes a first computing environment including a linker and a number of symbol table entries, each of the number of symbol table entries corresponding to a symbol and including a symbol value and an indicator of whether the symbol is pending. The linker is coupled to the symbol table to use the symbol table to link a number of software modules loaded into a memory space together.

DETAILED DESCRIPTION

An exemplary linker and linking process may be implemented as part of an exemplary embodiment according to the present invention. The exemplary linker and linking process allow for the linking of software modules without the need for specific ordering of software modules during the linking process ("out-of-order" linking). Software modules may be linked in any order, and symbol references may be resolved without leaving dangling references for undefined symbols. Furthermore, software modules may be "unlinked," such that a software module in a set of previously linked software modules may be replaced by a replacement software module, without sacrificing the integrity of the previously linked software modules or the computing environment.

The exemplary embodiment according to the present invention will now be described with reference to FIGS.

Figure 1:
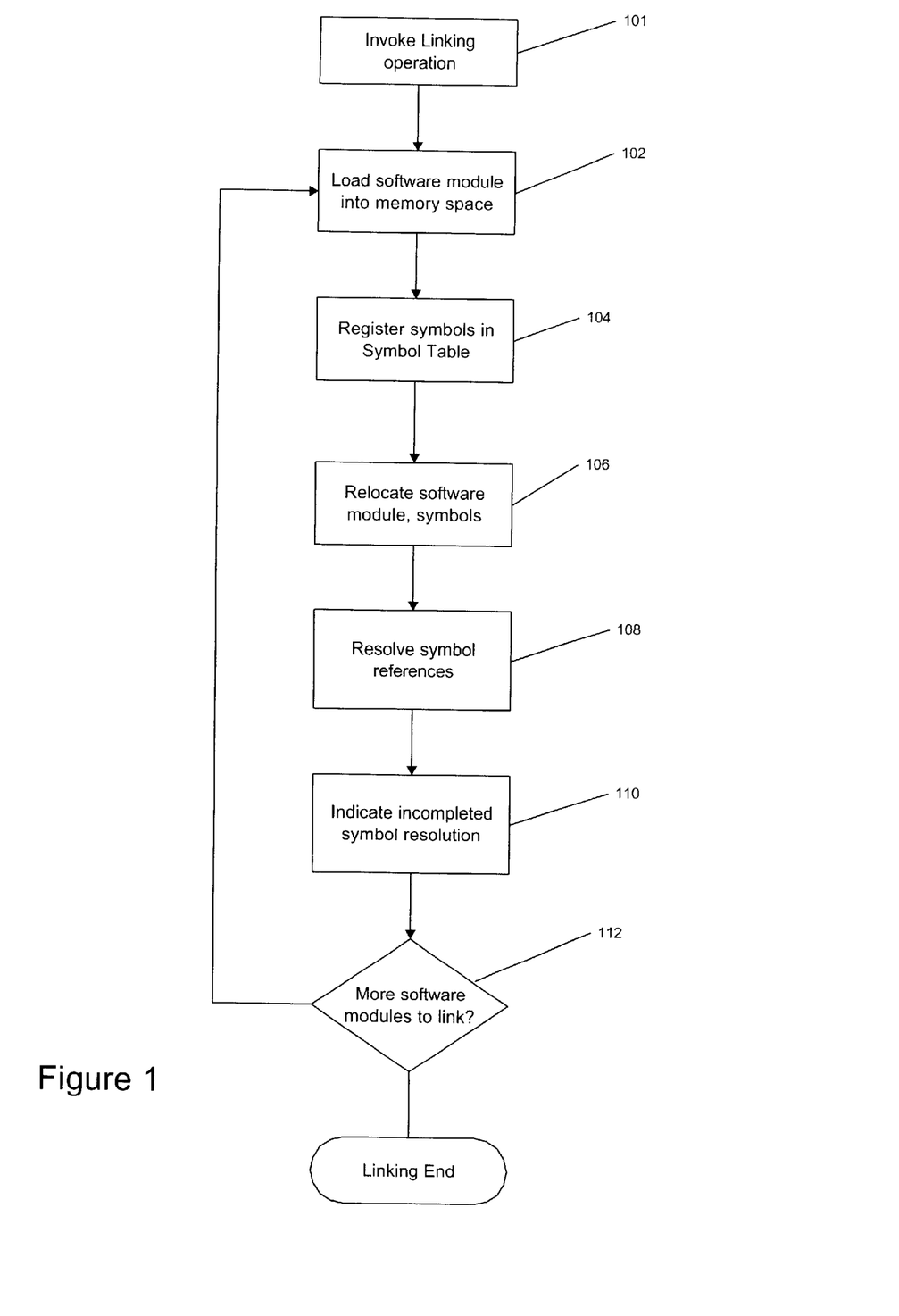
FIG. 1 shows a flow chart of an exemplary linking process, according to the present invention.

1–9. FIG. 1 shows a flow chart of an exemplary linking process that allows for out-of-order linking of software modules. The exemplary linking process may be performed by a "linker" application, which may be provided as part of an operating system or as part of a software development environment. An exemplary linker 150 is shown by the block diagram of FIG. 2 as part of a computing environment 148, which will be explained in conjunction with the flow chart of FIG. 1.

In step 101, the exemplary linking operation is invoked, for example, by issuing a command to execute the linker. The exemplary linking operation is used to load and link one or more software modules to form a single functional unit (e.g., an application). The software modules may include processor instructions, data structures, memory mapped I/O locations, and/or other elements employed in typical software implementations. In the present embodiment, the linking operation may comprise both the loading of software modules into a memory space of the computing environment and the linking of software modules together, although these operations may also be performed by separate "loader" and "linker" applications, as is well known. The invocation may identify the particular software module(s) to be linked, or the identity of the software modules to be linked may be based on their presence in a known location (e.g., a particular file directory). Other identification methods are also possible. The software modules may be stored in a secondary storage system 154 to which the linker 150 has access (e.g., disk, network connection interface), as shown in FIG. 2.

Figure 2:
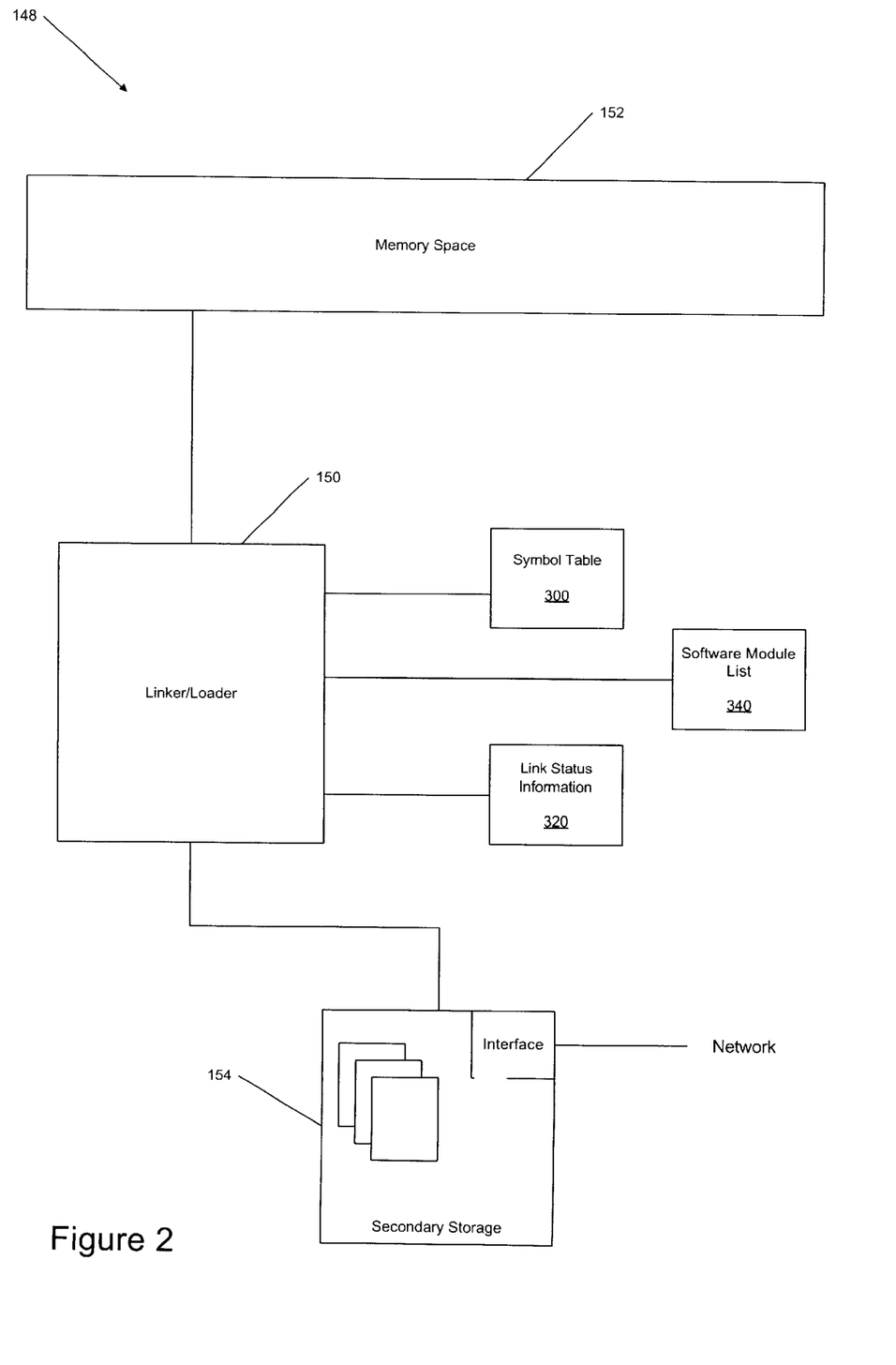
FIG. 2 shows a block diagram of an exemplary computer environment including a linker, according to the present invention.

In step 102, a software module to be linked is loaded into a memory space (for example, memory space 152 shown in FIG. 2). The memory space may include, for example, well known volatile memory devices (e.g., RAM), as well as non-volatile memory devices (e.g., disk, flash RAM). Note that the memory space may be an "intended" memory space: for example, software modules may be linked in a software development environment for use in a particular memory space in another computing environment outside of the development environment (e.g., an embedded computing system). The software module will be located in a portion of the memory space (the portion need not be contiguous) that may be identified by a set of memory addresses. The memory addresses may be grouped, such that each grouping may be represented by a "base address" that can be applied to determine an actual location for a section of the software module in the portion of the memory space. For example, the software module may be loaded such that one of its sections is located in one area of memory (having a "first" base address) and another of its sections is located in a second area of memory (having a "second" base address).

Figure 6:
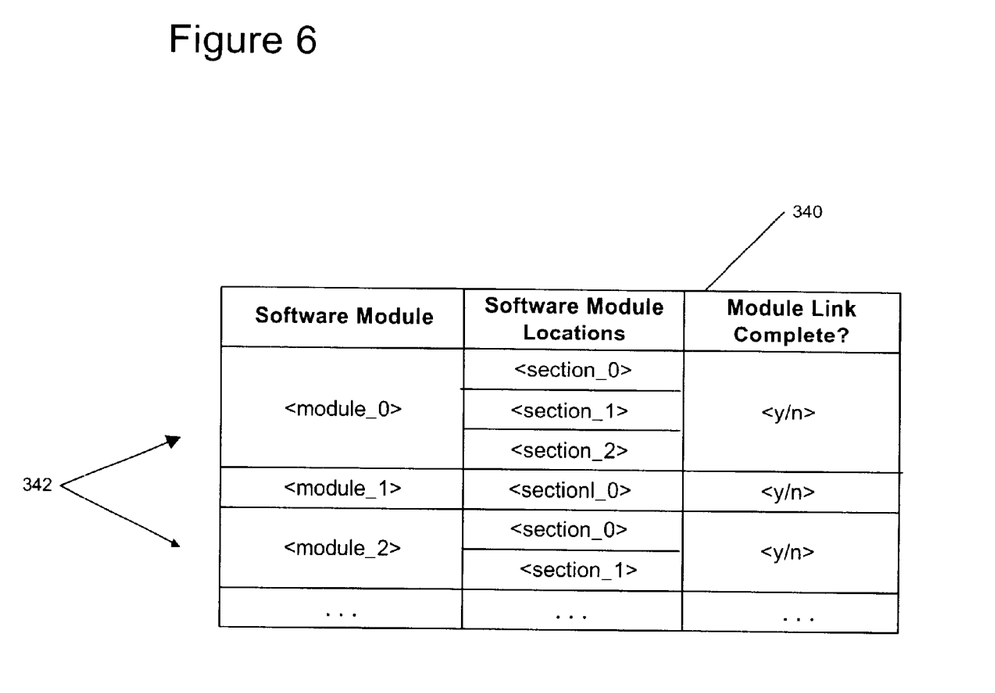
FIG. 6 shows an exemplary software module list, according to the present invention.

The identity of each software module loaded into the memory space may be maintained by the linker (or by the operating system), for example, in a software module list data structure. An exemplary software module list 340 is illustrated in FIG. 6. The software module list may include the name of each software module that is loaded into the memory space, as well as the memory locations used by each section of the software module. Other information, such as whether the software module has been completely linked, may also be stored in the software module list, as will be further described below. As shown in FIG. 2, linker 150 may have access to software module list 340 in order to perform the exemplary loading and linking processes.

In step 104, symbols defined in the software module are registered in a symbol table, which may be maintained by the linker application (or the operating system) in order to track the use of symbols by software modules. Each software module may define one or more symbols to allow other software modules to access certain locations in the software module (for example, a data structure that may be shared or a library function that may be called). These symbols may be presented as a list of symbol definitions—for example, symbol name and associated value—in the software module for use by the linker.

Figure 3:
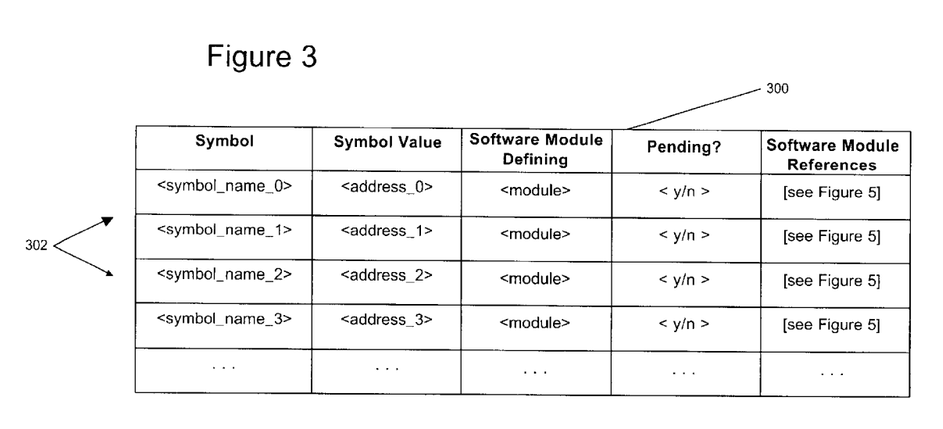
FIG. 3 shows an exemplary symbol table, according to the present invention.

An exemplary symbol table 300 is shown in FIG. 3. Symbol table 300 includes a number of symbol table entries 302, each symbol table entry used to specify definitional information for a single symbol, as well as linking information for that symbol. Exemplary symbol table entries 302 include fields for the symbol name, the symbol's value, an identifier of the software module that has defined the symbol, and whether the symbol is "pending" (described below). Initially, each symbol's value is set by the software module which defines the symbol (which may be an unrelocated value, as explained below). Each symbol table entry may also include fields for identifying the software modules which reference the symbol and information related to these references. The significance of this information is described below.

In step 106, relative references in the software module are "relocated" according to the location of the software module in the memory space. Memory references in each section of the software module may be initially specified relative to a zero address (for the start of each section) prior to loading into memory space 152. Upon loading into the memory space, these memory references need to be adjusted to match the actual addresses of the referenced elements in the memory space. As mentioned previously, each area of memory into which a section of the software module has been loaded may be represented by a base address. Memory references may be adjusted, for example, by adding the appropriate base address to the memory reference value. The symbol values for symbols defined by the software module are also relocated by applying the appropriate base address to the (unrelocated) symbol value.

In step 108, symbol references in the software module are resolved. As mentioned earlier, instructions in software modules may contain references to memory locations external to the software module. These external references may be denoted by symbols in the software module that allow a linkage to the external memory location. The linker parses the software module for the use of symbol references in the software module. Where a symbol reference is found in a software module, the symbol reference is resolved by determining the symbol's value from the symbol's entry in the symbol table. Any instructions that use the symbol reference may then be changed based on the symbol value—e.g., the symbol value may be inserted into the instruction. Further details of the symbol resolution procedure will be described below with reference to FIG. 4.

Figure 8:
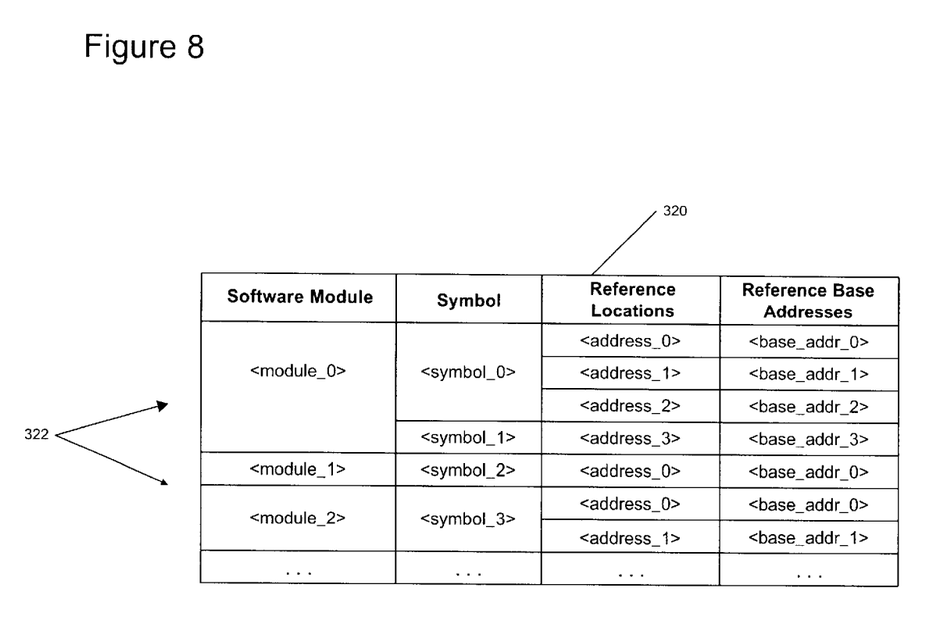
FIG. 8 shows an exemplary link status information data structure, according to the present invention.

In step 110, if the linker has been unable to resolve any one of the symbol references in the software module, the linking process for the software module may be indicated to be incomplete. This indication may take several forms: the linker may generate a message for display, indicating that the linking process did not complete; the linker may also record the software module as being incompletely linked in software module list 340. Additionally (or alternatively), the linker may maintain a link status information data structure for storing indications of incomplete software module linking. An exemplary link status information data structure 320 is shown in FIG. 8, and is accessible by linker 150 (see FIG. 2). Link status information data structure 320 may include entries 322 for each software module, which include fields, for example, for the software module name, the unresolved symbols in the software module, and the memory locations of the unresolved symbols. The link status information data structure may be used, for example, prior to execution of an application being linked to ensure that the loading and linking processes have been successfully completed. The link status information data structure may also be accessed by utilities present in computing environment 148 (for example, software development tools, not shown) to obtain status information concerning the loading and linking process.

In step 112, the linker determines whether there are any software modules remaining to be linked. The invocation of the linker may specify a list of software modules to be linked, for example, by a command line instruction to the linker, by a particular location storing the software modules, or by the contents of the software modules themselves. If further software modules need to be linked, steps 102–110 are performed for each software module. When all software modules have been linked, the functional unit is complete, and can be used as desired.

The embodiment according to the present invention allows for software modules to be linked in any order. Thus, it is possible that a linking procedure may be performed on a software module that may have several references to symbols that have not yet been defined. The embodiment employs a method and system whereby the resolution of these references is effectively deferred until the symbol is defined. An exemplary resolution procedure is illustrated as shown by the flow chart of FIG. 4. As mentioned above for step 108 of FIG. 1, symbol reference resolution is performed by parsing the software module for each occurrence of a symbol reference. When a symbol reference is found, the linker attempts to locate the referenced symbol in the symbol table (step 202).

Figure 4:
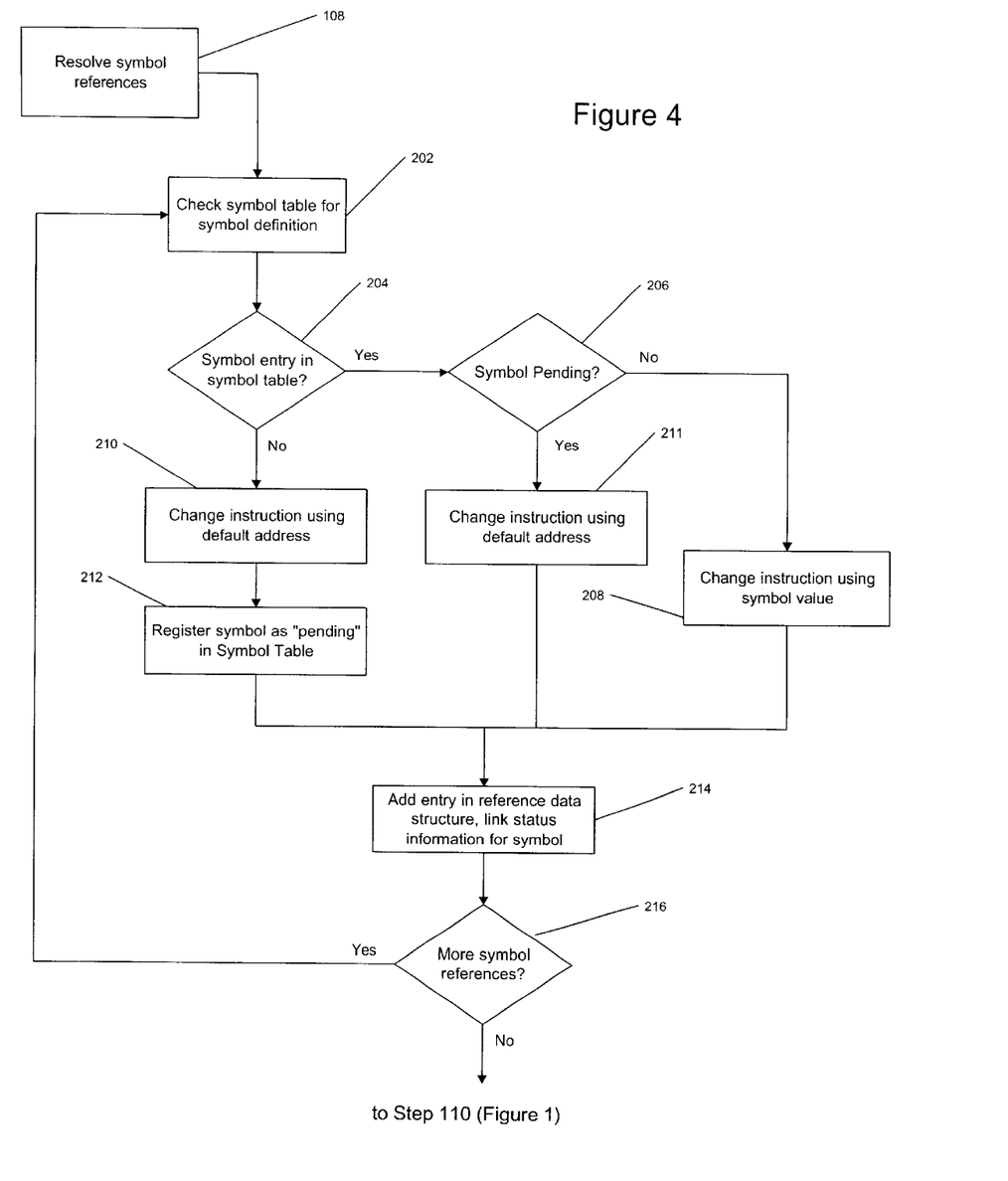
FIG. 4 shows a flow chart of an exemplary resolution procedure, according to the present invention.

If the symbol is not found in the symbol table (step 204), the memory reference of the instruction that uses the symbol reference is changed by inserting a "default" address value into the memory reference of the instruction that uses the symbol reference (step 210). The default address is, for example, a predetermined memory address which is otherwise inaccessible (i.e., invalid), and would therefore cause an error if it were accessed during execution. Thus, when a symbol cannot be correctly resolved, instructions using the symbol are set to the default address, which will cause an error condition when the instruction reference is executed (if the symbol reference is not later properly resolved, as is described below).

In addition to setting those instructions that use the symbol reference to the default address, the unresolved symbol is registered in the symbol table, thus indicating that the symbol is referenced by a software module (step 212). However, since the symbol has not been defined, the entry in the symbol table for the symbol indicates that the symbol is "pending," and thus has the default address as its associated value. Also, an entry is made (step 214) in a reference data structure for the symbol (and also in the link status information data structure, if used) that identifies the software module that contains the symbol reference, the address of the instruction using the symbol reference and the base address that should be applied to the address to properly relocate the address. By tracking the locations where symbol references are used, these symbol references can be resolved at a later time.

Figure 5:
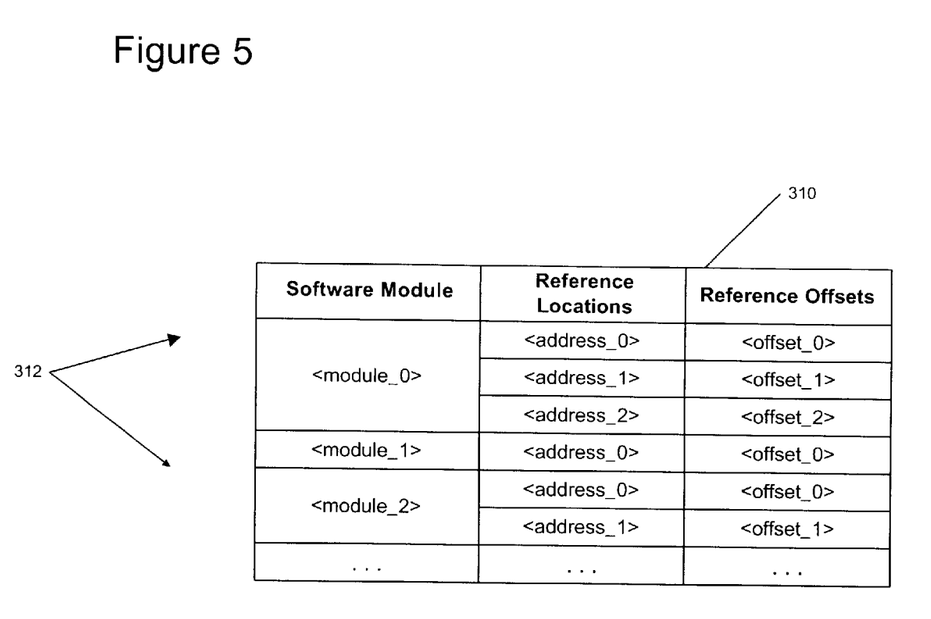
FIG. 5 shows an exemplary reference data structure of the symbol table of FIG. 3, according to the present invention.

An example of a reference data structure 310 is shown in FIG. 5. Each symbol in the symbol table 300 may include a reference data structure 310 (even those symbols that are defined, for reasons described below). An entry 312 may be made in the reference data structure for each software module which references the symbol and each location in that software module where the symbol reference is used (including appropriate fields for storing addresses for each location).

If the symbol is found in the symbol table, the entry for the symbol in the symbol table is checked to determine if the symbol is pending definition (step 206). If the symbol is still pending, then any instructions using the symbol reference are also changed by inserting the default address into any instructions using the symbol reference (step 211), and an entry is made in the reference data structure (and link status information data structure) for the symbol, identifying the software module and location of the instruction using the symbol reference (step 214). If the symbol is not pending (i.e., the symbol is already defined), the value associated with the symbol is retrieved from the symbol table and used to change those instructions using the symbol reference to the correct value (step 208). An entry may also be made in the reference data structure for the symbol, identifying the software module and location of the symbol reference (step 214), which allows later re-linking of the software module (described below). The linker may then continue to parse the software module for additional symbol references, until all symbol references have been processed (step 216).

By using the resolution procedure described above, no dangling references are produced, since all instructions using unresolved symbol references are set to the default address. Thus, if these symbol references remain unresolved, execution of the instruction using the symbol reference will cause a defined error condition (e.g., a memory fault), which can be appropriately handled by the operating system (e.g., the task executing the offending instruction may be shut down).

The embodiment according to the present invention also provides a procedure for resolving the unresolved symbol references identified during the exemplary linking process. This procedure is illustrated by the flow chart of FIG. 7, which takes as its starting point the symbol registration step (step 104) from FIG. 1. During symbol registration, the name of the symbol to be registered is compared to the entries already present in the symbol table, to determine whether an entry has already been made for the symbol in the symbol table (step 250). An entry for the symbol will already be present in the symbol table where, for example, an unresolved symbol reference exists in an earlier loaded software module (as described above). If there is no entry for the symbol in the symbol table, the symbol is registered as previously described (step 252).

Figure 7:
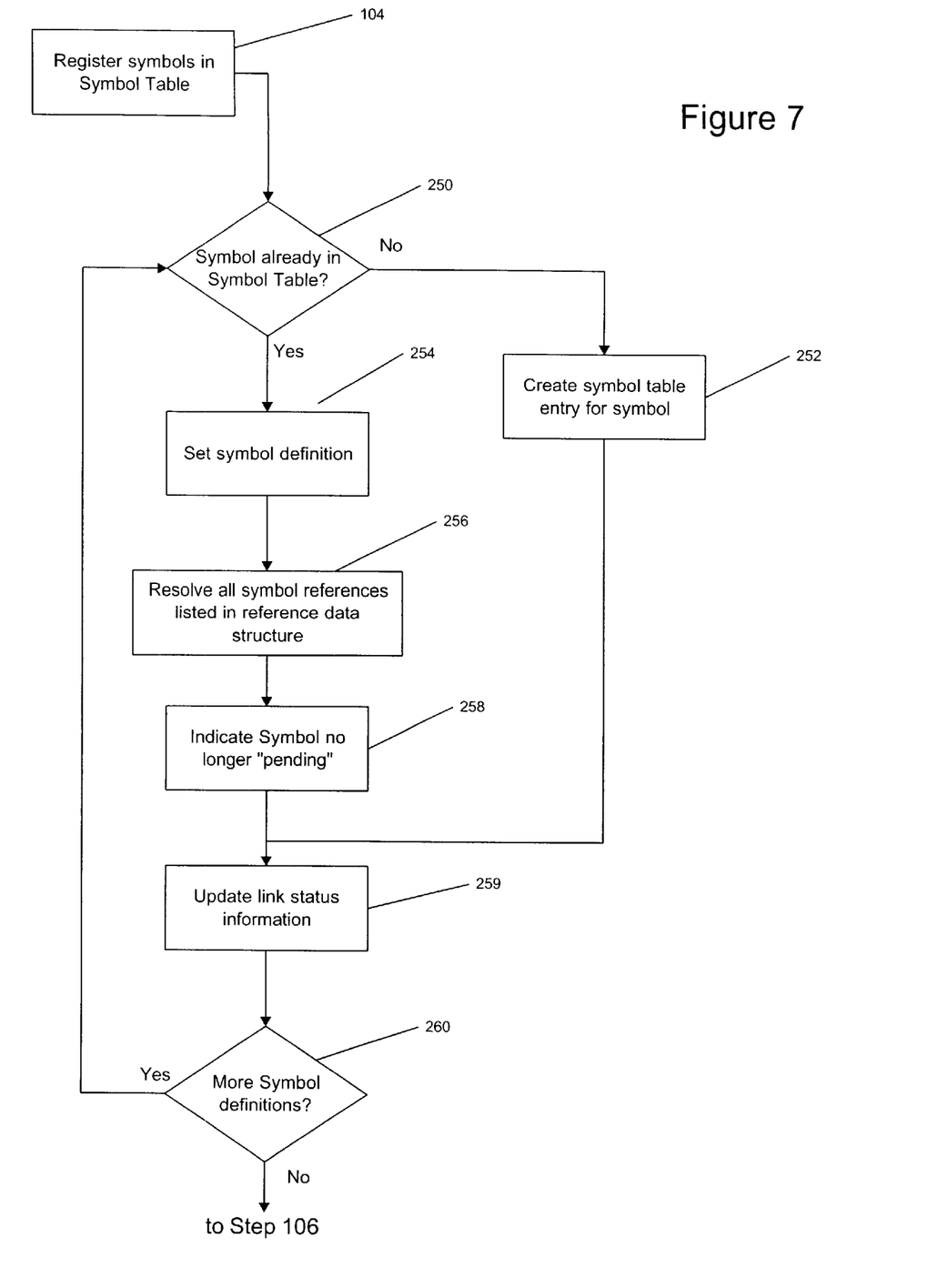
FIG. 7 shows a flow chart of an exemplary procedure for resolving unresolved symbol references, according to the present invention.

If there already is an entry for the symbol in the symbol table, the definitional information for the symbol from the software module (e.g., the symbol's value) is used to fill in the fields of the entry in the symbol table for the symbol (step 254), thus defining the symbol. The linker can then attempt to resolve any symbol references to the symbol that are present in previously loaded software modules, as is indicated in the reference data structure of the symbol table entry (step 256). Since the reference data structure includes the memory location of each instruction using the symbol reference, the symbol value may be used to replace the default address that was previously stored at that memory location. The symbol may also be indicated to no longer be in a "pending" state (step 258). The link status information data structure may be updated based on the symbol definition (step 259), and the process may continue until all symbol definitions have been added to the symbol table (step 260).

The exemplary embodiment thus provides facilities to allow out-of-order linking of software modules without resulting dangling references. All instructions using unresolved symbol references are set to a predefined default value, so that if the symbol reference is never resolved, execution of the instruction using the symbol reference will cause a predefined error condition. Furthermore, the unresolved symbol references are tracked, such that they may be resolved as additional software modules containing the necessary symbol definitions are loaded.

Note that the symbol registration, relocation and resolution steps may be performed in alternate orders. For example, symbol definitions and symbol references may be used to generate the symbol table prior to relocation. In such a case, unrelocated symbol values and base addresses associated with each symbol may be stored in the symbol table (including default values, in the case of pending symbols). Instructions using the symbol reference may be changed by computing the relocated address for the symbol (e.g., by adding the base address associated with the symbol to the unrelocated symbol value/default value) and inserting the result into any instructions using the symbol reference.

The exemplary embodiment according to the present invention further provides facilities to allow for easy "unlinking" and "re-linking" of software modules in an already linked functional unit of software modules. Such an operation may be desired as part of an "upgrade," allowing for a software module to be replaced by a new software module. An exemplary unloading procedure that may be implemented according to the described exemplary embodiment is illustrated by the flow chart of FIG. 9. In step 402, an instruction is provided to invoke the unloading/unlinking process, for example, by issuing a command to the linker to unload a particular software module. The software module to be unloaded is identified in the software module list data structure (see FIG. 6), to determine, for example, the memory locations used by the software module (step 404). The software module may then be unloaded (step 406) by deleting the instructions and/or data structures of the software module from the memory locations (for example, by returning the memory locations used by the software module to the system for free allocation).

Figure 9:
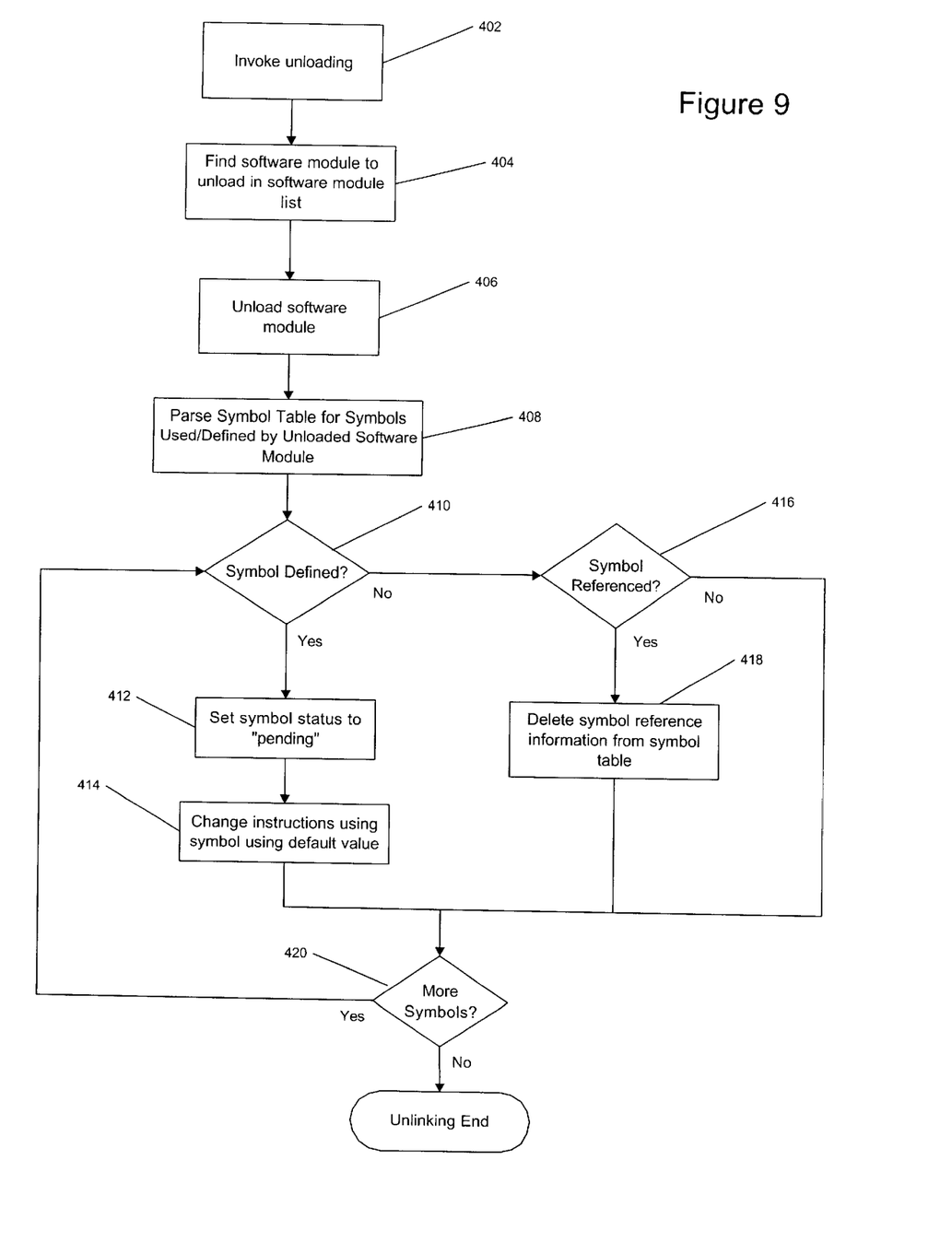
FIG. 9 shows a flow chart of an exemplary unloading procedure, according to the present invention.

The symbol table may be parsed to identify those symbols defined or referenced by the software module (step 408). For each symbol defined by the software module (step 410), the symbol's entry in the symbol table is located, and its status is set to "pending" (step 412). The reference data structure for the symbol is used to set each of the instructions using symbol references to the symbol to the default value (step 414) to prevent any dangling references that could cause unpredictable results if these instructions were executed after the unloading of the software module. (If used, the link status information data structure may be similarly updated.) Since the reference data structure should contain all of the symbol references for the symbol used by instructions in all software modules (based on the exemplary resolution procedure described above, see FIG. 4), no dangling references should be caused by the unloading of the software module.

For symbols references made by the unloaded software module (step 416), these symbol references are deleted from the symbol's reference data structure (step 418), since these references are no longer needed. If this deletion causes a symbol to no longer have any symbol references, and the symbol is a pending symbol, the entry for the symbol may be deleted from the symbol table (which may reduce memory consumption by the sumbol table). The process may continue (step 420) until all symbols are parsed.

The exemplary unloading procedure permits an unloading of software modules without jeopardizing system stability, since removed symbol definitions cause instructions that use the associated symbol references to be set to the default address. Note that the symbol table may retain an entry for each "unloaded" symbol (if the symbol is referenced by another software module), although this symbol is indicated to be "pending." A new software module with a matching symbol definition may therefore be loaded (for example, according to the exemplary linking process described above) and the symbol references in the existing software modules will be resolved to the new software module. Thus, the linking process of the exemplary embodiment according to the present invention allows for easy substitution of software modules without the need to completely re-link all software modules.

Alterations of the implementation described above for the exemplary embodiment may also be used while still achieving flexible linking. For example, the software module list and the symbol table may be combined into a single data structure otherwise containing the information necessary for performing the flexible linking procedures described above. In addition, as previously mentioned, the performance order of steps (as illustrated in FIG. 1) may be altered while still achieving the out-of-order linking process; for example, sections of a software module may be loaded, relocated and linked individually, or symbol definitions and symbol references may be located and entered in the symbol table prior to relocation.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A method, comprising:

locating a symbol reference to a symbol in a first software module, the first software module including at least one instruction using the symbol reference;

parsing a symbol table to locate an entry for the symbol, the entry for the symbol including a symbol value;

creating the entry for the symbol in the symbol table when the parsing does not locate the entry for the symbol in the symbol table, the entry for the symbol including a pending indication and a default value as the symbol value; and changing the at least one instruction using the symbol reference based on the default value.

2. The method of claim 1, wherein the entry for the symbol includes a reference data structure indicating a location of the at least one instruction using the symbol reference.

3. The method of claim 1, further comprising:

locating a symbol definition for the symbol in a second software module, the symbol definition including a symbol value definition;

parsing the symbol table to locate the entry for the symbol;

editing the entry for the symbol in the symbol table when the parsing locates the entry for the symbol and the entry for the symbol includes the pending indication, including removing the pending indication and changing the symbol value to the symbol value definition; and changing the at least one instruction using the symbol reference based on the symbol value.

4. The method of claim 3, wherein the entry for the symbol includes a reference data structure indicating a location of the at least one instruction using the symbol reference, and wherein the location of the at least one instruction using the symbol reference is used in the changing of the at least one instruction using the symbol reference based on the symbol value.

5. The method of claim 3, further comprising:

loading the first software module into a first portion of a memory space having a first set of memory locations and the second software module into a second portion of the memory space having a second set of memory locations.

6. The method of claim 5, further comprising:

relocating the first software module based on the first set of memory locations; and relocating the second software module based on the second set of memory locations.

7. The method of claim 6, wherein the symbol value includes an unrelocated value and a base address, and wherein the base address is determined based on the relocation of the second software module.

8. The method of claim 1, further comprising:

retrieving a symbol value associated with the symbol from the entry for the symbol when the entry for the symbol is located in the symbol table; and inserting the symbol value into the at least one instruction using the symbol reference when the entry for the symbol is located in the symbol table.

9. The method of claim 1, wherein the changing of the at least one instruction using the symbol reference based on the default value comprises inserting the default value into the at least one instruction using the symbol reference.

10. The method of claim 1, wherein the changing of the at least one instruction using the symbol reference based on the default value comprises computing a relocated default value based on the default value and inserting the relocated default value into the at least one instruction using the symbol reference.

11. A method, comprising:

unloading a software module from a set of linked software modules;

parsing a symbol table to locate at least one symbol table entry associated with a symbol defined by the software module, the at least one symbol table entry including a symbol value and a reference data structure of a number of locations using the symbol;

changing the symbol value to a default value;

including in the at least one symbol table entry a pending indication; and changing the number of locations using the symbol based on the default value.

12. The method of claim 11, further comprising:

parsing the symbol table to locate at least one symbol table entry associated with a symbol referenced by the software module, the at least one symbol table entry associated with the symbol referenced by the software module including a reference data structure including a number of addresses to locations within the software module using the symbol; and removing from the reference data structure of the at least one symbol table entry associated with the symbol referenced by the software module the number of addresses to locations within the software module using the symbol.

13. The method of claim 12, further comprising:

removing the at least one symbol table entry associated with the symbol referenced by the software module when the reference data structure is empty and the at least one symbol table entry associated with the symbol referenced by the software module includes a pending indication.

14. A system, comprising:

a first computing environment including a linker; and a number of symbol table entries, each of the number of symbol table entries corresponding to a symbol and including a symbol value and an indicator of whether the symbol is pending;

wherein the linker is coupled to the symbol table to use the symbol table to link a number of software modules loaded into a memory space.

15. The system of claim 14, wherein each of the number of symbol table entries includes a reference data structure including fields for a number of addresses to locations using the symbol in the number of software modules loaded into the memory space.

16. The system of claim 14, further comprising:

a software module list including a number of software module entries, each of the number of software module entries corresponding to one of the number of software modules loaded into the memory space.

17. The system of claim 16, wherein each of the number of software module entries includes an indicator of whether the corresponding software module has been completely linked.

18. The system of claim 14, wherein the memory space is a virtual memory space.

19. The system of claim 14, wherein the first computing environment is a software development environment.

20. The system of claim 19, wherein the memory space is an intended memory space for a second computing environment.

21. The system of claim 14, wherein the linker includes a loader to load the number of software modules into the memory space.

22. The system of claim 14, further comprising a link status information data structure coupled to the linker and including a number of link status entries corresponding to the number of software modules loaded into the memory space respectively.

23. The system of claims 22, wherein each of the link status entries for a corresponding software module includes fields for undefined symbols used in the corresponding software module and addresses for memory locations using the undefined symbols.

* * * * *